US011029795B2

(12) United States Patent
Moyal et al.

(10) Patent No.: US 11,029,795 B2
(45) Date of Patent: *Jun. 8, 2021

(54) SYSTEM AND METHOD TO MEASURE CAPACITANCE OF CAPACITIVE SENSOR ARRAY

(71) Applicant: Cypress Semiconductor Corporation, San Jose, CA (US)

(72) Inventors: Nathan Y. Moyal, West Linn, OR (US); Dana Jon Olson, Kirkland, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 82 days.

This patent is subject to a terminal disclaimer.

(21) Appl. No.: 16/510,750

(22) Filed: Jul. 12, 2019

(65) Prior Publication Data

US 2020/0012365 A1 Jan. 9, 2020

Related U.S. Application Data

(63) Continuation of application No. 13/670,671, filed on Nov. 7, 2012, now Pat. No. 10,386,969, which is a continuation of application No. 12/239,692, filed on Sep. 26, 2008, now Pat. No. 8,321,174.

(51) Int. Cl.
*G06F 3/044* (2006.01)
*G06F 3/041* (2006.01)

(52) U.S. Cl.
CPC ........ *G06F 3/0446* (2019.05); *G06F 3/04166* (2019.05)

(58) Field of Classification Search
CPC .......................... G06F 3/0446; G06F 3/04166
See application file for complete search history.

(56) References Cited

U.S. PATENT DOCUMENTS

| 3,660,801 A | 5/1972 | Bernard |
| 3,921,167 A | 11/1975 | Fox |
| 3,979,745 A | 9/1976 | Bishop |
| 4,039,940 A | 8/1977 | Butler et al. |
| 4,090,092 A | 5/1978 | Serrano |
| 4,103,252 A | 7/1978 | Bobick |

(Continued)

FOREIGN PATENT DOCUMENTS

| EP | 0574213 A | 12/1993 |
| GB | 05000604 B2 | 2/2005 |

(Continued)

OTHER PUBLICATIONS

"CSD User Module Data Sheet," CSD v1.0, Oct. 23, 2006; 58 pages.

(Continued)

*Primary Examiner* — Toan M Le
*Assistant Examiner* — Xiuqin Sun (57) ABSTRACT

A system and method for determining position information. The method includes selecting a column, a first row, and a second row of a capacitive sensor array. The first row and second row intersect with the column of the capacitive sensor array. The method further includes measuring a differential capacitance between the first row and the second row and utilizing the differential capacitance in determining a location of an object proximate to the capacitive sensor array.

20 Claims, 6 Drawing Sheets

(56) References Cited

U.S. PATENT DOCUMENTS

| | | |
|---|---|---|
| 4,113,378 A | 9/1978 | Wirtz |
| 4,145,748 A | 3/1979 | Eichelberger et al. |
| 4,193,063 A | 3/1980 | Hitt et al. |
| 4,238,711 A | 12/1980 | Wallot |
| 4,264,903 A | 4/1981 | Bigelow |
| 4,266,144 A | 5/1981 | Bristol |
| 4,283,713 A | 8/1981 | Philipp |
| 4,292,604 A | 9/1981 | Embree et al. |
| 4,293,734 A | 10/1981 | Pepper |
| 4,305,135 A | 12/1981 | Dahl et al. |
| 4,438,404 A | 3/1984 | Philipp |
| 4,475,151 A | 10/1984 | Philipp |
| 4,497,575 A | 2/1985 | Philipp |
| 4,558,274 A | 12/1985 | Carusillo |
| 4,560,830 A | 12/1985 | Perl |
| 4,586,260 A | 5/1986 | Baxter et al. |
| 4,614,937 A | 9/1986 | Poujois |
| 4,728,932 A | 3/1988 | Atherton |
| 4,736,097 A | 4/1988 | Philipp |
| 4,736,191 A | 4/1988 | Matzke et al. |
| 4,742,331 A | 5/1988 | Barrow et al. |
| 4,772,983 A | 9/1988 | Kerber et al. |
| 4,773,024 A | 9/1988 | Faggin et al. |
| 4,802,103 A | 1/1989 | Faggin et al. |
| 4,825,147 A | 4/1989 | Cook et al. |
| 4,831,325 A | 5/1989 | Watson, Jr. |
| 4,876,534 A | 10/1989 | Mead et al. |
| 4,878,013 A | 10/1989 | Andermo |
| 4,879,461 A | 11/1989 | Philipp |
| 4,879,505 A | 11/1989 | Barrow et al. |
| 4,879,508 A | 11/1989 | Andermo |
| 4,920,399 A | 4/1990 | Hall |
| 4,935,702 A | 6/1990 | Mead et al. |
| 4,940,980 A | 7/1990 | Tice |
| 4,953,928 A | 9/1990 | Anderson et al. |
| 4,962,342 A | 10/1990 | Mead et al. |
| 4,977,480 A | 12/1990 | Nishihara |
| 5,008,497 A | 4/1991 | Asher |
| 5,049,758 A | 9/1991 | Mead et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,089,757 A | 2/1992 | Wilson |
| 5,095,284 A | 3/1992 | Mead |
| 5,097,305 A | 3/1992 | Mead et al. |
| 5,107,149 A | 4/1992 | Platt et al. |
| 5,109,261 A | 4/1992 | Mead et al. |
| 5,117,071 A | 5/1992 | Greanias et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,146,106 A | 9/1992 | Anderson et al. |
| 5,160,899 A | 11/1992 | Anderson et al. |
| 5,165,054 A | 11/1992 | Platt et al. |
| 5,166,562 A | 11/1992 | Allen et al. |
| 5,204,549 A | 4/1993 | Platt et al. |
| 5,214,388 A | 5/1993 | Vranish et al. |
| 5,237,879 A | 8/1993 | Speeter |
| 5,243,554 A | 9/1993 | Allen et al. |
| 5,248,873 A | 9/1993 | Allen et al. |
| 5,260,592 A | 11/1993 | Mead et al. |
| 5,270,963 A | 12/1993 | Allen et al. |
| 5,276,407 A | 1/1994 | Mead et al. |
| 5,281,862 A | 1/1994 | Ma |
| 5,289,023 A | 2/1994 | Mead |
| 5,294,889 A | 3/1994 | Heep et al. |
| 5,303,329 A | 4/1994 | Mead et al. |
| 5,305,017 A | 4/1994 | Gerpheide |
| 5,323,158 A | 6/1994 | Ferguson |
| 5,324,958 A | 6/1994 | Mead et al. |
| 5,331,215 A | 7/1994 | Allen et al. |
| 5,336,936 A | 8/1994 | Allen et al. |
| 5,339,213 A | 8/1994 | O'Callaghan |
| 5,349,303 A | 9/1994 | Gerpheide |
| 5,373,245 A | 12/1994 | Vranish |
| 5,374,787 A | 12/1994 | Miller et al. |
| 5,381,515 A | 1/1995 | Platt et al. |
| 5,384,467 A | 1/1995 | Plimon et al. |
| 5,386,219 A | 1/1995 | Greanias et al. |
| 5,408,194 A | 4/1995 | Steinbach et al. |
| 5,412,387 A | 5/1995 | Vincelette et al. |
| 5,424,756 A | 6/1995 | Ho et al. |
| 5,461,321 A | 10/1995 | Sanders et al. |
| 5,479,103 A | 12/1995 | Kernahan et al. |
| 5,488,204 A | 1/1996 | Mead et al. |
| 5,495,077 A | 2/1996 | Miller et al. |
| 5,518,078 A | 5/1996 | Tsujioka et al. |
| 5,525,980 A | 6/1996 | Jahier et al. |
| 5,541,580 A | 7/1996 | Gerston et al. |
| 5,541,878 A | 7/1996 | LeMoncheck et al. |
| 5,543,588 A | 8/1996 | Bisset et al. |
| 5,543,590 A | 8/1996 | Gillespie et al. |
| 5,543,591 A | 8/1996 | Gillespie et al. |
| 5,555,907 A | 9/1996 | Philipp |
| 5,565,658 A | 10/1996 | Gerpheide et al. |
| 5,566,702 A | 10/1996 | Philipp |
| 5,572,205 A | 11/1996 | Caldwell et al. |
| 5,589,856 A | 12/1996 | Stein et al. |
| 5,629,891 A | 5/1997 | LeMoncheck et al. |
| 5,648,642 A | 7/1997 | Miller et al. |
| 5,650,597 A | 7/1997 | Redmayne |
| 5,670,915 A | 9/1997 | Cooper et al. |
| 5,672,959 A | 9/1997 | Der |
| 5,680,070 A | 10/1997 | Anderson et al. |
| 5,682,032 A | 10/1997 | Philipp |
| 5,684,487 A | 11/1997 | Timko |
| 5,691,513 A | 11/1997 | Yamamoto et al. |
| 5,694,063 A | 12/1997 | Burlison et al. |
| 5,730,165 A | 3/1998 | Philipp |
| 5,748,185 A | 5/1998 | Stephan et al. |
| 5,757,368 A | 5/1998 | Gerpheide et al. |
| 5,760,852 A | 6/1998 | Wu et al. |
| 5,763,909 A | 6/1998 | Mead et al. |
| 5,763,924 A | 6/1998 | Lum et al. |
| 5,767,457 A | 6/1998 | Gerpheide et al. |
| 5,796,183 A | 8/1998 | Hourmand |
| 5,801,340 A | 9/1998 | Peter |
| 5,812,698 A | 9/1998 | Platt et al. |
| 5,841,078 A | 11/1998 | Miller et al. |
| 5,844,256 A | 12/1998 | Mead et al. |
| 5,844,265 A | 12/1998 | Mead et al. |
| 5,854,625 A | 12/1998 | Frisch et al. |
| 5,861,583 A | 1/1999 | Schediwy et al. |
| 5,861,875 A | 1/1999 | Gerpheide |
| 5,864,242 A | 1/1999 | Allen et al. |
| 5,864,392 A | 1/1999 | Winklhofer et al. |
| 5,880,411 A | 3/1999 | Gillespie et al. |
| 5,889,236 A | 3/1999 | Gillespie et al. |
| 5,905,489 A | 5/1999 | Takahama et al. |
| 5,914,465 A | 6/1999 | Allen et al. |
| 5,914,708 A | 6/1999 | LaGrange et al. |
| 5,920,309 A | 7/1999 | Bisset et al. |
| 5,920,310 A | 7/1999 | Faggin et al. |
| 5,926,566 A | 7/1999 | Wang et al. |
| 5,942,733 A | 8/1999 | Allen et al. |
| 5,943,052 A | 8/1999 | Allen et al. |
| 5,949,264 A | 9/1999 | Lo |
| 5,969,513 A | 10/1999 | Clark |
| 6,023,422 A | 2/2000 | Allen et al. |
| 6,028,271 A | 2/2000 | Gillespie et al. |
| 6,028,959 A | 2/2000 | Wang et al. |
| 6,037,929 A | 3/2000 | Ogura et al. |
| 6,037,930 A | 3/2000 | Wolfe et al. |
| 6,060,957 A | 5/2000 | Kodmja et al. |
| 6,067,019 A | 5/2000 | Scott |
| 6,097,432 A | 8/2000 | Mead et al. |
| 6,140,853 A | 10/2000 | Lo |
| 6,145,850 A | 11/2000 | Rehm |
| 6,148,104 A | 11/2000 | Wang et al. |
| 6,184,871 B1 | 2/2001 | Teres et al. |
| 6,185,450 B1 | 2/2001 | Seguine et al. |

(56) References Cited

U.S. PATENT DOCUMENTS

| | | | |
|---|---|---|---|
| 6,188,228 B1 | 2/2001 | Philipp |
| 6,188,391 B1 | 2/2001 | Seely et al. |
| 6,191,723 B1 | 2/2001 | Lewis |
| 6,222,528 B1 | 4/2001 | Gerpheide et al. |
| 6,239,389 B1 | 5/2001 | Allen et al. |
| 6,249,447 B1 | 6/2001 | Boylan et al. |
| 6,262,717 B1 | 7/2001 | Donohue et al. |
| 6,271,719 B1 | 8/2001 | Sevastopoulos |
| 6,271,720 B1 | 8/2001 | Sevastopoulos |
| 6,271,835 B1 | 8/2001 | Hoeksma |
| 6,278,283 B1 | 8/2001 | Tsugai |
| 6,280,391 B1 | 8/2001 | Olson et al. |
| 6,288,707 B1 | 9/2001 | Philipp |
| 6,295,052 B1 | 9/2001 | Kato et al. |
| 6,304,014 B1 | 10/2001 | England et al. |
| 6,320,184 B1 | 11/2001 | Winklhofer et al. |
| 6,323,846 B1 | 11/2001 | Westerman et al. |
| 6,326,859 B1 | 12/2001 | Goldman et al. |
| 6,342,817 B1 | 1/2002 | Crofts et al. |
| 6,344,773 B1 | 2/2002 | Sevastopoulos et al. |
| 6,353,200 B1 | 3/2002 | Schwankhart |
| 6,366,099 B1 | 4/2002 | Reddi |
| 6,377,009 B1 | 4/2002 | Philipp |
| 6,377,129 B1 | 4/2002 | Rhee et al. |
| 6,380,929 B1 | 4/2002 | Platt |
| 6,380,931 B1 | 4/2002 | Gillespie et al. |
| 6,400,217 B1 | 6/2002 | Bhandari |
| 6,414,671 B1 | 7/2002 | Gillespie et al. |
| 6,424,338 B1 | 7/2002 | Anderson |
| 6,430,305 B1 | 8/2002 | Decker |
| 6,441,073 B1 | 8/2002 | Tanaka et al. |
| 6,441,682 B1 | 8/2002 | Vinn et al. |
| 6,445,257 B1 | 9/2002 | Cox et al. |
| 6,448,911 B1 | 9/2002 | Somayajula |
| 6,452,514 B1 | 9/2002 | Philipp |
| 6,457,355 B1 | 10/2002 | Philipp |
| 6,459,321 B1 | 10/2002 | Belch |
| 6,466,036 B1 | 10/2002 | Philipp |
| 6,473,069 B1 | 10/2002 | Gerpheide |
| 6,476,798 B1 | 11/2002 | Bertram et al. |
| 6,489,899 B1 | 12/2002 | Ely et al. |
| 6,490,203 B1 | 12/2002 | Tang |
| 6,498,720 B2 | 12/2002 | Glad |
| 6,499,359 B1 | 12/2002 | Washeleski et al. |
| 6,522,083 B1 | 2/2003 | Roach |
| 6,522,128 B1 | 2/2003 | Ely et al. |
| 6,522,187 B1 | 2/2003 | Sousa |
| 6,523,416 B2 | 2/2003 | Takagi et al. |
| 6,529,015 B2 | 3/2003 | Nonoyama et al. |
| 6,534,970 B1 | 3/2003 | Ely et al. |
| 6,535,200 B2 | 3/2003 | Philipp |
| 6,570,557 B1 | 5/2003 | Westerman et al. |
| 6,574,095 B2 | 6/2003 | Suzuki |
| 6,577,140 B1 | 6/2003 | Wenman |
| 6,583,632 B2 | 6/2003 | Basse et al. |
| 6,587,093 B1 | 7/2003 | Shaw et al. |
| 6,597,347 B1 | 7/2003 | Yasutake |
| 6,610,936 B2 | 8/2003 | Gillespie et al. |
| 6,614,313 B2 | 9/2003 | Crofts et al. |
| 6,624,640 B2 | 9/2003 | Lund et al. |
| 6,639,586 B2 | 10/2003 | Gerpheide |
| 6,642,857 B1 | 11/2003 | Schediwy et al. |
| 6,649,924 B1 | 11/2003 | Philipp et al. |
| 6,667,740 B2 | 12/2003 | Ely et al. |
| 6,673,308 B2 | 1/2004 | Hino et al. |
| 6,677,758 B2 | 1/2004 | Maki et al. |
| 6,677,932 B1 | 1/2004 | Westerman |
| 6,680,731 B2 | 1/2004 | Gerpheide et al. |
| 6,683,462 B2 | 1/2004 | Shimizu |
| 6,690,066 B1 | 2/2004 | Lin et al. |
| 6,704,005 B2 | 3/2004 | Kato et al. |
| 6,705,511 B1 | 3/2004 | Dames et al. |
| 6,714,817 B2 | 3/2004 | Daynes et al. |
| 6,720,777 B2 | 4/2004 | Wang |
| 6,730,863 B1 | 5/2004 | Gerpheide et al. |
| 6,731,121 B1 | 5/2004 | Hsu et al. |
| 6,744,258 B2 | 6/2004 | Ishio et al. |
| 6,750,852 B2 | 6/2004 | Gillespie et al. |
| 6,768,420 B2 | 7/2004 | McCarthy et al. |
| 6,774,644 B2 | 8/2004 | Eberlein |
| 6,781,577 B2 | 8/2004 | Shigetaka |
| 6,788,221 B1 | 9/2004 | Ely et al. |
| 6,788,521 B2 | 9/2004 | Nishi |
| 6,798,218 B2 | 9/2004 | Kasperkovitz |
| 6,806,693 B1 | 10/2004 | Bron |
| 6,809,275 B1 | 10/2004 | Cheng et al. |
| 6,810,442 B1 | 10/2004 | Lin et al. |
| 6,825,673 B1 | 11/2004 | Yamaoka |
| 6,825,890 B2 | 11/2004 | Matsufusa |
| 6,829,727 B1 | 12/2004 | Pawloski |
| 6,838,887 B2 | 1/2005 | Denen et al. |
| 6,839,052 B1 | 1/2005 | Kramer |
| 6,856,433 B2 | 2/2005 | Hatano et al. |
| 6,859,159 B2 | 2/2005 | Michalski |
| 6,861,961 B2 | 3/2005 | Sandbach et al. |
| 6,873,203 B1 | 3/2005 | Paul et al. |
| 6,879,215 B1 | 4/2005 | Roach |
| 6,882,338 B2 | 4/2005 | Flowers |
| 6,888,536 B2 | 5/2005 | Westerman et al. |
| 6,888,538 B2 | 5/2005 | Ely et al. |
| 6,891,531 B2 | 5/2005 | Lin |
| 6,893,724 B2 | 5/2005 | Lin et al. |
| 6,897,673 B2 | 5/2005 | Savage et al. |
| 6,903,402 B2 | 6/2005 | Miyazawa |
| 6,904,570 B2 | 6/2005 | Foote et al. |
| 6,914,547 B1 | 7/2005 | Swaroop et al. |
| 6,933,873 B1 | 8/2005 | Horsley et al. |
| 6,940,291 B1 | 9/2005 | Ozick |
| 6,946,853 B2 | 9/2005 | Gifford et al. |
| 6,949,811 B2 | 9/2005 | Miyazawa |
| 6,949,937 B2 | 9/2005 | Knoedgen |
| 6,958,594 B2 | 10/2005 | Redl et al. |
| 6,969,978 B2 | 11/2005 | Dening |
| 6,970,120 B1 | 11/2005 | Bjornsen |
| 6,970,126 B1 | 11/2005 | O'Dowd et al. |
| 6,975,123 B1 | 12/2005 | Malang et al. |
| 6,993,607 B2 | 1/2006 | Philipp |
| 6,999,009 B2 | 2/2006 | Monney |
| 7,002,557 B2 | 2/2006 | Iizuka et al. |
| 7,006,078 B2 | 2/2006 | Kim |
| 7,006,938 B2 | 2/2006 | Laraia et al. |
| 7,030,782 B2 | 4/2006 | Ely et al. |
| 7,030,860 B1 | 4/2006 | Hsu et al. |
| 7,031,886 B1 | 4/2006 | Hargreaves |
| 7,032,051 B2 | 4/2006 | Reay et al. |
| 7,036,096 B1 | 4/2006 | Sarkar et al. |
| 7,046,230 B2 | 5/2006 | Zadesky et al. |
| 7,068,039 B2 | 6/2006 | Parker |
| 7,075,316 B2 | 7/2006 | Umeda et al. |
| 7,075,523 B2 | 7/2006 | Marten et al. |
| 7,075,864 B2 | 7/2006 | Kakitsuka et al. |
| 7,078,916 B2 | 7/2006 | Denison |
| 7,098,675 B2 | 8/2006 | Inaba et al. |
| 7,109,978 B2 | 9/2006 | Gillespie et al. |
| 7,119,550 B2 | 10/2006 | Kitano et al. |
| 7,129,714 B2 | 10/2006 | Baxter |
| 7,129,935 B2 | 10/2006 | Mackey |
| 7,133,140 B2 | 11/2006 | Lukacs et al. |
| 7,133,793 B2 | 11/2006 | Ely et al. |
| 7,136,051 B2 | 11/2006 | Hein et al. |
| 7,141,968 B2 | 11/2006 | Hibbs et al. |
| 7,141,987 B2 | 11/2006 | Hibbs et al. |
| 7,148,704 B2 | 12/2006 | Philipp |
| 7,151,276 B2 | 12/2006 | Gerlach et al. |
| 7,151,528 B2 | 12/2006 | Taylor et al. |
| 7,158,056 B2 | 1/2007 | Wright et al. |
| 7,158,125 B2 | 1/2007 | Sinclair et al. |
| 7,202,655 B2 | 4/2007 | Itoh |
| 7,202,857 B2 | 4/2007 | Hinckley et al. |
| 7,205,777 B2 | 4/2007 | Schulz et al. |
| 7,212,189 B2 | 5/2007 | Shaw et al. |
| 7,224,591 B2 | 5/2007 | Kaishita et al. |
| 7,225,090 B2 | 5/2007 | Coley |
| 7,233,508 B2 | 6/2007 | Itoh |

(56) References Cited

U.S. PATENT DOCUMENTS

| | | |
|---|---|---|
| 7,235,983 B2 | 6/2007 | McCartney et al. |
| 7,245,131 B2 | 7/2007 | Kurachi et al. |
| 7,253,643 B1 | 8/2007 | Seguine |
| 7,254,775 B2 | 8/2007 | Geaghan et al. |
| 7,256,588 B2 | 8/2007 | Howard et al. |
| 7,262,609 B2 | 8/2007 | Reynolds |
| 7,271,608 B1 | 9/2007 | Vermeire et al. |
| 7,288,946 B2 | 10/2007 | Hargreaves et al. |
| 7,288,977 B2 | 10/2007 | Stanley |
| 7,298,124 B2 | 11/2007 | Kan et al. |
| 7,301,350 B2 | 11/2007 | Hargreaves et al. |
| 7,307,485 B1 | 12/2007 | Snyder et al. |
| 7,312,616 B2 | 12/2007 | Snyder |
| 7,323,879 B2 | 1/2008 | Kuo et al. |
| 7,323,886 B2 | 1/2008 | Lee |
| 7,333,090 B2 | 2/2008 | Tanaka et al. |
| 7,339,580 B2 | 3/2008 | Westerman et al. |
| 7,359,816 B2 | 4/2008 | Kumar et al. |
| 7,375,535 B1 | 5/2008 | Kutz et al. |
| 7,381,031 B2 | 6/2008 | Kawaguchi et al. |
| 7,392,431 B2 | 6/2008 | Swoboda |
| 7,417,411 B2 | 8/2008 | Hoffman et al. |
| 7,417,441 B2 | 8/2008 | Reynolds |
| 7,423,437 B2 | 9/2008 | Hargreaves et al. |
| 7,439,962 B2 | 10/2008 | Reynolds et al. |
| 7,449,895 B2 | 11/2008 | Ely et al. |
| 7,450,113 B2 | 11/2008 | Gillespie et al. |
| 7,451,050 B2 | 11/2008 | Hargreaves |
| 7,453,270 B2 | 11/2008 | Hargreaves et al. |
| 7,453,279 B2 | 11/2008 | Corbin et al. |
| 7,466,307 B2 | 12/2008 | Trent, Jr. et al. |
| 7,479,788 B2 | 1/2009 | Bolender et al. |
| 7,495,659 B2 | 2/2009 | Marriott et al. |
| 7,499,040 B2 | 3/2009 | Zadesky et al. |
| 7,504,833 B1 | 3/2009 | Seguine |
| 7,515,140 B2 | 4/2009 | Philipp |
| 7,521,941 B2 | 4/2009 | Ely et al. |
| RE40,867 E | 8/2009 | Binstead |
| 7,598,752 B2 | 10/2009 | Li |
| 7,598,822 B2 | 10/2009 | Rajagopal et al. |
| 7,656,168 B2 | 2/2010 | Mahowald et al. |
| 7,663,607 B2 | 2/2010 | Hotelling et al. |
| 7,667,468 B1 | 2/2010 | Anderson |
| 7,683,641 B2 | 3/2010 | Hargreaves et al. |
| 7,804,307 B1 | 9/2010 | Bokma et al. |
| 7,812,825 B2 | 10/2010 | Sinclair et al. |
| 7,812,827 B2 | 10/2010 | Hotelling et al. |
| 7,812,829 B2 | 10/2010 | Gillespie et al. |
| 7,821,274 B2 | 10/2010 | Philipp et al. |
| 7,831,070 B1 | 11/2010 | Cheng et al. |
| 7,880,481 B2 | 2/2011 | Zangl et al. |
| 7,911,456 B2 | 3/2011 | Gillespie et al. |
| 7,932,897 B2 | 4/2011 | Elias et al. |
| 7,952,366 B2 | 5/2011 | Philipp et al. |
| 7,969,166 B2 | 6/2011 | Fasshauer |
| 8,040,142 B1 | 10/2011 | Bokma et al. |
| 8,040,321 B2 | 10/2011 | Peng et al. |
| 8,040,325 B2 | 10/2011 | Lee et al. |
| 8,054,299 B2 | 11/2011 | Krah |
| 8,067,948 B2 | 11/2011 | Sequine |
| 8,068,097 B2 | 11/2011 | GuangHai |
| 8,072,429 B2 | 12/2011 | Grivna |
| 8,082,566 B2 | 12/2011 | Stallings |
| 8,089,288 B1 | 1/2012 | Maharita |
| 8,089,289 B1 | 1/2012 | Kremin et al. |
| 8,093,914 B2 | 1/2012 | Maharyta et al. |
| 8,094,128 B2 | 1/2012 | Vu et al. |
| 8,111,243 B2 | 2/2012 | Peng et al. |
| 8,144,125 B2 | 3/2012 | Peng et al. |
| 8,144,126 B2 | 3/2012 | Wright |
| 8,169,238 B1 | 5/2012 | Maharyta et al. |
| 8,358,142 B2 | 1/2013 | Maharyta |
| 8,525,798 B2 | 9/2013 | Peterson et al. |
| 8,717,042 B1 | 5/2014 | Seguine |
| 8,902,172 B2 | 12/2014 | Peng et al. |
| 8,941,394 B2 | 1/2015 | Martin et al. |
| 10,386,969 B1 * | 8/2019 | Moyal .................. G06F 3/04166 |
| 2001/0012667 A1 | 8/2001 | Ma et al. |
| 2002/0000978 A1 | 1/2002 | Gerpheide |
| 2002/0063688 A1 | 5/2002 | Shaw et al. |
| 2002/0067348 A1 | 6/2002 | Masters et al. |
| 2002/0080014 A1 | 6/2002 | Mccarthy et al. |
| 2002/0109035 A1 | 8/2002 | Denen et al. |
| 2002/0136372 A1 | 9/2002 | Bozorgui-Nesbat |
| 2002/0140440 A1 | 10/2002 | Haase |
| 2002/0191029 A1 | 12/2002 | Gillespie et al. |
| 2003/0014239 A1 | 1/2003 | Ichbiah et al. |
| 2003/0025679 A1 | 2/2003 | Taylor et al. |
| 2003/0028346 A1 | 2/2003 | Sinclair et al. |
| 2003/0062889 A1 | 4/2003 | Ely et al. |
| 2003/0063073 A1 | 4/2003 | Geaghan et al. |
| 2003/0063428 A1 | 4/2003 | Nishi |
| 2003/0076306 A1 | 4/2003 | Zadesky et al. |
| 2003/0080755 A1 | 5/2003 | Kobayashi |
| 2003/0091220 A1 | 5/2003 | Sato et al. |
| 2003/0098858 A1 | 5/2003 | Perski et al. |
| 2003/0112021 A1 | 6/2003 | Palata et al. |
| 2003/0156098 A1 | 8/2003 | Shaw et al. |
| 2003/0160808 A1 | 8/2003 | Foote et al. |
| 2003/0178675 A1 | 9/2003 | Nishizaka et al. |
| 2003/0183864 A1 | 10/2003 | Miyazawa |
| 2003/0183884 A1 | 10/2003 | Miyazawa |
| 2003/0184315 A1 | 10/2003 | Eberlein |
| 2003/0189419 A1 | 10/2003 | Maki et al. |
| 2003/0230438 A1 | 12/2003 | Keefer et al. |
| 2003/0232507 A1 | 12/2003 | Chen |
| 2004/0041798 A1 | 3/2004 | Kim |
| 2004/0056845 A1 | 3/2004 | Harkcom et al. |
| 2004/0068409 A1 | 4/2004 | Tanaka et al. |
| 2004/0082198 A1 | 4/2004 | Nakamura et al. |
| 2004/0169594 A1 | 9/2004 | Ely et al. |
| 2004/0178989 A1 | 9/2004 | Shahoian et al. |
| 2004/0178997 A1 | 9/2004 | Gillespie et al. |
| 2004/0183560 A1 | 9/2004 | Savage et al. |
| 2004/0217945 A1 | 11/2004 | Miyamoto et al. |
| 2004/0239616 A1 | 12/2004 | Collins |
| 2004/0239650 A1 | 12/2004 | Mackey |
| 2004/0252109 A1 | 12/2004 | Trent et al. |
| 2004/0263864 A1 | 12/2004 | Lukacs et al. |
| 2005/0021269 A1 | 1/2005 | Ely et al. |
| 2005/0024341 A1 | 2/2005 | Gillespie et al. |
| 2005/0031175 A1 | 2/2005 | Hara et al. |
| 2005/0035956 A1 | 2/2005 | Sinclair et al. |
| 2005/0062732 A1 | 3/2005 | Sinclair et al. |
| 2005/0073302 A1 | 4/2005 | Hibbs et al. |
| 2005/0073322 A1 | 4/2005 | Hibbs et al. |
| 2005/0083110 A1 | 4/2005 | Latham et al. |
| 2005/0099188 A1 | 5/2005 | Baxter |
| 2005/0159126 A1 | 7/2005 | Wang |
| 2005/0169768 A1 | 8/2005 | Kawaguchi et al. |
| 2005/0179668 A1 | 8/2005 | Edwards |
| 2005/0270273 A1 | 12/2005 | Marten |
| 2005/0275382 A1 | 12/2005 | Stessman et al. |
| 2005/0280639 A1 | 12/2005 | Taylor et al. |
| 2005/0283330 A1 | 12/2005 | Laraia et al. |
| 2006/0022660 A1 | 2/2006 | Itoh |
| 2006/0026535 A1 | 2/2006 | Hotelling et al. |
| 2006/0032680 A1 | 2/2006 | Elias et al. |
| 2006/0033508 A1 | 2/2006 | Lee |
| 2006/0033724 A1 | 2/2006 | Chaudhri et al. |
| 2006/0038793 A1 | 2/2006 | Philipp |
| 2006/0049834 A1 | 3/2006 | Umeda |
| 2006/0053387 A1 | 3/2006 | Ording |
| 2006/0066582 A1 | 3/2006 | Lyon et al. |
| 2006/0066585 A1 | 3/2006 | Lin |
| 2006/0097991 A1 | 5/2006 | Hotelling et al. |
| 2006/0097992 A1 | 5/2006 | Gitzinger et al. |
| 2006/0108349 A1 | 5/2006 | Finley et al. |
| 2006/0113974 A1 | 6/2006 | Kan et al. |
| 2006/0114247 A1 | 6/2006 | Brown |
| 2006/0139469 A1 | 6/2006 | Yokota et al. |
| 2006/0152739 A1 | 7/2006 | Silvestre |
| 2006/0158202 A1 | 7/2006 | Umeda et al. |
| 2006/0164142 A1 | 7/2006 | Stanley |

(56) References Cited

U.S. PATENT DOCUMENTS

| | | |
|---|---|---|
| 2006/0172767 A1 | 8/2006 | Cathey et al. |
| 2006/0176718 A1 | 8/2006 | Itoh |
| 2006/0187214 A1 | 8/2006 | Gillespie et al. |
| 2006/0193156 A1 | 8/2006 | Kaishita et al. |
| 2006/0197750 A1 | 9/2006 | Kerr et al. |
| 2006/0197752 A1 | 9/2006 | Hurst et al. |
| 2006/0221061 A1 | 10/2006 | Fry |
| 2006/0227117 A1 | 10/2006 | Proctor |
| 2006/0232559 A1 | 10/2006 | Chien et al. |
| 2006/0256090 A1 | 11/2006 | Huppi |
| 2006/0258390 A1 | 11/2006 | Cui et al. |
| 2006/0262101 A1 | 11/2006 | Layton et al. |
| 2006/0267953 A1 | 11/2006 | Peterson et al. |
| 2006/0273804 A1 | 12/2006 | Delorme et al. |
| 2006/0290678 A1 | 12/2006 | Lii |
| 2007/0046299 A1 | 3/2007 | Hargreaves et al. |
| 2007/0069274 A1 | 3/2007 | Elsass et al. |
| 2007/0074913 A1 | 4/2007 | Geaghan et al. |
| 2007/0076897 A1 | 4/2007 | Philipp |
| 2007/0079996 A1 | 4/2007 | Lee et al. |
| 2007/0100566 A1 | 5/2007 | Coley |
| 2007/0132737 A1 | 6/2007 | Mulligan et al. |
| 2007/0152983 A1 | 7/2007 | Mckillop et al. |
| 2007/0164756 A1 | 7/2007 | Lee |
| 2007/0173220 A1 | 7/2007 | Kim et al. |
| 2007/0176609 A1 | 8/2007 | Ely et al. |
| 2007/0176903 A1 | 8/2007 | Dahlin et al. |
| 2007/0228256 A1 | 10/2007 | Mentzer et al. |
| 2007/0229466 A1 | 10/2007 | Peng et al. |
| 2007/0229469 A1 | 10/2007 | Seguine |
| 2007/0236478 A1 | 10/2007 | Geaghan et al. |
| 2007/0257894 A1 | 11/2007 | Philipp |
| 2007/0263191 A1 | 11/2007 | Shibazaki |
| 2007/0268243 A1 | 11/2007 | Choo et al. |
| 2007/0268265 A1 | 11/2007 | Xiaoping |
| 2007/0268273 A1 | 11/2007 | Westerman et al. |
| 2007/0268274 A1 | 11/2007 | Westerman et al. |
| 2007/0268275 A1 | 11/2007 | Westerman et al. |
| 2007/0273659 A1 | 11/2007 | XiaoPing et al. |
| 2007/0291013 A1 | 12/2007 | Won |
| 2007/0296709 A1 | 12/2007 | GuangHai |
| 2008/0007529 A1 | 1/2008 | Paun et al. |
| 2008/0007534 A1 | 1/2008 | Peng et al. |
| 2008/0024455 A1 | 1/2008 | Lee et al. |
| 2008/0036473 A1 | 2/2008 | Jansson |
| 2008/0041639 A1 | 2/2008 | Westerman et al. |
| 2008/0041640 A1 | 2/2008 | Gillespie et al. |
| 2008/0042986 A1 | 2/2008 | Westerman et al. |
| 2008/0042987 A1 | 2/2008 | Westerman et al. |
| 2008/0042988 A1 | 2/2008 | Westerman et al. |
| 2008/0042989 A1 | 2/2008 | Westerman et al. |
| 2008/0042994 A1 | 2/2008 | Gillespie et al. |
| 2008/0047764 A1 | 2/2008 | Lee et al. |
| 2008/0048997 A1 | 2/2008 | Gillespie et al. |
| 2008/0062139 A1 | 3/2008 | Hotelling et al. |
| 2008/0062140 A1 | 3/2008 | Hotelling et al. |
| 2008/0062148 A1 | 3/2008 | Hotelling et al. |
| 2008/0068100 A1 | 3/2008 | Goodnow et al. |
| 2008/0072192 A1 | 3/2008 | Lenahan |
| 2008/0088595 A1 | 4/2008 | Liu et al. |
| 2008/0111714 A1 | 5/2008 | Kremin |
| 2008/0116904 A1 | 5/2008 | Reynolds et al. |
| 2008/0128182 A1 | 6/2008 | Westerman et al. |
| 2008/0136792 A1 | 6/2008 | Peng et al. |
| 2008/0150906 A1 | 6/2008 | Grivna |
| 2008/0158177 A1 | 7/2008 | Wilson et al. |
| 2008/0158178 A1 | 7/2008 | Hotelling et al. |
| 2008/0162997 A1 | 7/2008 | Vu et al. |
| 2008/0165134 A1 | 7/2008 | Krah |
| 2008/0179112 A1 | 7/2008 | Qin et al. |
| 2008/0180399 A1 | 7/2008 | Cheng |
| 2008/0196945 A1 | 8/2008 | Konstas |
| 2008/0250864 A1 | 10/2008 | Shipton |
| 2008/0266263 A1 | 10/2008 | Motaparti et al. |
| 2008/0278178 A1 | 11/2008 | Philipp |
| 2008/0309623 A1 | 12/2008 | Hotelling et al. |
| 2008/0309634 A1 | 12/2008 | Hotelling et al. |
| 2009/0002206 A1 | 1/2009 | Kremin |
| 2009/0096758 A1 | 4/2009 | Hotelling et al. |
| 2009/0153152 A1 | 6/2009 | Maharyta et al. |
| 2009/0322351 A1 | 12/2009 | McLeod |
| 2010/0001973 A1 | 1/2010 | Hotelling et al. |
| 2010/0328262 A1 | 12/2010 | Huang et al. |
| 2011/0025629 A1 | 2/2011 | Grivna et al. |
| 2011/0234523 A1 | 9/2011 | Chang et al. |
| 2012/0043140 A1 | 2/2012 | Peterson et al. |
| 2012/0043973 A1 | 2/2012 | Kremin |
| 2013/0049771 A1 | 2/2013 | Peng et al. |
| 2013/0127779 A1 | 5/2013 | Lillie et al. |

FOREIGN PATENT DOCUMENTS

| | | |
|---|---|---|
| JP | 04012528 | 1/1992 |
| JP | 05283519 | 10/1993 |
| JP | 6104334 A | 4/1994 |
| JP | 6163528 A | 6/1994 |
| WO | 0002188 A | 1/2000 |

OTHER PUBLICATIONS

"Sigma-Delta ADCs and DACs, AN-283 Application Note, Analog Devices," 1993; Downloaded from <http://www.analog.com/UpoloadedFiles/Application_Notes/292524291525717245054923680458171AN283.pdf>; 16 pages.

"The Virtual Keyboard: I-Tech Bluetooth/Serial Virtual Laser Keyboard Available Now!" The Virtual Laser Keyboard (VKB) Online Worldwide Shop, <http://www.virtual-laser-keyboard.com>, downloaded Apr. 13, 2006; 4 pages.

Andrew S. Tanenbaum with contributions from James R. Goodman, "Structured Computer Organization," 1999, Prentice Hall, Fourth Edition; 32 pages.

U.S. Appl. No. 12/239,692 "System and Method to Measure Capacitance of Capacitive Sensor Array" Nathan Moyal et al., filed Sep. 26, 2008; 34 pages.

Chapweske, Adam; "The PS/2 Mouse Interface," PS/2 Mouse Interfacing, 2001, retrieved on May 18, 2006; 11 pages.

Chris Mack, "Semiconductor Lithography—The Basic Process," Gentleman Scientist, downloaded Apr. 20, 2006, http://www.lithoguru.com/scientist/lithobasics.html; 12 pages.

Cypress Semiconductor Corporation, "CY8C21x34 Data Sheet," CSR User Module, CSR V.1.0; Oct. 6, 2005; 36 pages.

Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.

Cypress Semiconductor Corporation, "FAN Controller CG6457AM and CG6462AM," PSoC Mixed Signal Array Preliminary Data Sheet; May 24, 2005; 25 pages.

Cypress Semiconductor Corporation, "PSoC CY8C20x34 Technical Reference Manual (TRM)," PSoC CY8C20x34 TRM, Version 1.0, 2006; 218 pages.

Cypress Semiconductor Corporation, "PSoC Mixed-Signal Controllers," Production Description; <http://www.cypress.com/portal/server>; retrieved on Sep. 27, 2005; 2 pages.

Cypress Semiconductor Corporation, "Release Notes sm017," Jan. 24, 2007; 3 pages.

Dave Van Ess, "Understanding Switched Capacitor Analog Blocks," Application Note AN2041, Mar. 30, 2004; 16 pages.

Dennis Seguine, "Capacitive Switch Scan," AN2233a, Application Note, CY8C21x34, Apr. 7, 2005; 6 pages.

Janusz Mlodzianowski, "A Simple Multipurpose Logic Analyzer," Dec. 1997, Circuit Cellar Ink, Issue 89, pp. 28-36.

Larry K. Baxter, "Capacitive Sensors, Design and Applications," IEEE Press, The Institute of Electrical and Electronics Engineers Inc., Aug. 1996, pp. 177-187; 12 pages.

Lee, Mark; "EMC Design Considerations for PSoC CapSense Applications," Cypress Semiconductor Corporation, Application Note AN2318; Sep. 16, 2005; 6 pages.

(56) References Cited

OTHER PUBLICATIONS

Mark Lee, "CapSense Best Practices," Cypress Semiconductor Application Note, Oct. 16, 2006; 10 pages.

Milton Ohring, "The Materials Science of Thin Films: Deposition and Structure," 2nd Edition, Academic Press, 2002, pp. 336-337; 4 pages.

Min et al., "Offset Compensation of Capacitive Sensors for Electrostatic Microactuators," ISIE 2001, Pusan Korea, pp. 2114-2117.

Sangil Park, "Motorola Digital Signal Processors, Principles of Sigma-Delta Modulation for Analog-to-Digital Converters," Rev. 1, downloaded from <http://digitalsignallabs.com/SigmaDelta.pdf>, Mar. 1997; 64 pages.

Sedra, Adel S. et al., "Microelectronic Circuits," 3rd Edition, Oxford University Press, pp. xiii-xx and 861-883, 1991; 20 pages.

Ted Tsui, "Migrating from CSR to CSD," Cypress Semiconductor Corporation, Application Note AN2408, Feb. 8, 2007, http://www.cypress.com.

The Authoritative Dictionary of IEEE Standards Terms, 2000, IEEE Press Publications, 7th Edition, pp. 1133-1134; 4 pages.

USPTO Advisory Action for U.S. Appl. No. 13/670,671 dated Jun. 23, 2015; 3 pages.

USPTO Final Rejection for U.S. Appl. No. 12/239,692 dated May 9, 2011; 10 pages.

USPTO Final Rejection for U.S. Appl. No. 13/670,671 dated Oct. 17, 2018; 19 pages.

USPTO Final Rejection for U.S. Appl. No. 13/670,671 dated Feb. 28, 2017; 11 pages.

USPTO Final Rejection for U.S. Appl. No. 13/670,671 dated May 11, 2015; 13 pages.

USPTO Non Final Rejection for U.S. Appl. No. 13/670,671 dated May 8, 2018; 14 pages.

USPTO Non Final Rejection for U.S. Appl. No. 13/670,671 dated Sep. 26, 2016; 12 pages.

USPTO Non Final Rejection for U.S. Appl. No. 13/670,671 dated Dec. 11, 2017; 13 pages.

USPTO Non Final Rejection for U.S. Appl. No. 13/670,671 dated Dec. 29, 2014; 8 pages.

USPTO Non-Final Rejection for U.S. Appl. No. 12/239,692 dated Nov. 29, 2010; 9 pages.

USPTO Non-Final Rejection for U.S. Appl. No. 13/670,671 dated Sep. 12, 2014; 11 pages.

USPTO Notice of Allowance for U.S. Appl. No. 12/239,692 dated Jan. 5, 2012; 8 pages.

USPTO Notice of Allowance for U.S. Appl. No. 12/239,692 dated May 16, 2012; 8 pages.

USPTO Notice of Allowance for U.S. Appl. No. 12/239,692 dated Jun. 25, 2012; 8 pages.

USPTO Notice of Allowance for U.S. Appl. No. 12/239,692 dated Aug. 15, 2012; 8 pages.

USPTO Notice of Allowance for U.S. Appl. No. 12/239,692 dated Sep. 18, 2012; 8 pages.

USPTO Notice of Allowance for U.S. Appl. No. 12/239,692 dated Oct. 13, 2011; 8 pages.

USPTO Notice of Allowance for U.S. Appl. No. 13/670,671 dated Mar. 15, 2016; 7 pages.

USPTO Notice of Allowance for U.S. Appl. No. 13/670,671 dated Sep. 14, 2015; 8 pages.

USPTO Notice of Allowance for U.S. Appl. No. 13/670,671 dated Jun. 11, 2019; 10 pages.

USPTO Requirement for Restriction for U.S. Appl. No. 12/239,692 dated Sep. 27, 2010; 7 pages.

Van Ess, David; "Simulating a 555 Timer with PSoC," Cypress Semiconductor Corporation, Application Note AN2286, May 19, 2005; 10 pages.

Vladislav Golub, Ph.D., "Sigma-Delta ADCs", pub. date: Jun. 17, 2003, 10 pages.

Wikipedia, The Free Encyclopedia, "IBM PC Keyboard," <http://en.wikipedia.org/wiki/PC_keyboard> accessed Jun. 19, 2006; 3 pages.

\* cited by examiner

SYSTEM AND METHOD TO MEASURE CAPACITANCE OF CAPACITIVE SENSOR ARRAY

RELATED U.S. APPLICATIONS

This application is continuation application of U.S. patent application Ser. No. 13/670,671, filed on Nov. 7, 2012, which is a continuation of U.S. patent Ser. No. 12/239,692, filed on Sep. 26, 2008, now U.S. Pat. No. 8,321,174, issued on Nov. 27, 2012, all of which are incorporated by reference herein in their entirety.

This application is related to commonly assigned, co-pending patent application Ser. No. 12/167,552, filed on Jul. 3, 2008, entitled "Method For Normalizing Signal From A High-Impedance Array of Capacitive Sensors," and hereby incorporated by reference in its entirety.

This application is related to commonly assigned, co-pending patent application Ser. No. 12/167,494, filed on Jul. 3, 2008, entitled "Method For Improving Scan Time And Sensitivity In Touch Sensitive User Interface Device," and hereby incorporated by reference in its entirety.

FIELD OF INVENTION

Embodiments of the present invention generally relate to touch sensitive sensor arrays.

BACKGROUND OF THE INVENTION

As computing technology has developed, user interface devices have advanced correspondingly. User interfaces have become increasingly significant in the usability of a computing device.

One particular user interface becoming increasingly popular is the touch screen or track pad which uses an array of capacitive sensors using high impedance capacitance substrates. The current, based on the change of the capacitance at the intersection of a row and a column of the array, which varies depending on the presence or absence of a touch, e.g., a finger, etc.

Row and/or columns are scanned sequentially and independently, one by one across the array by a microprocessor. The microprocessor may start by measuring the capacitance at a first column and a first row, then measuring the capacitance for the intersection of the first column and a second row, and then measuring each subsequent intersection in the capacitive sensor array. Thus, if there are 10 rows and 10 columns, a total of 100 measurements of capacitance may be obtained and stored by the microprocessor. Based on the measurements, a centroid corresponding to the finger location may then determined by the microprocessor.

Measuring of each intersection of each row and column may result in the measurements being subject to variations in the physical properties of the sensor array. For example, temperature changes can increase or decrease the capacitance.

Further, measuring capacitance means that the measured range with includes the absolute value of the capacitance. For example, if the capacitance is 8 picofarads (pF) without a finger present and a capacitance of 8.1 pF indicates a touch, the measurement circuit may be calibrated to measure a range of 1 to 10 pF for instance while the dynamic range is only 0.1. This leads to low resolution. The centering of the measurement window by using current compensation may avoid this low resolution. The current compensation involves using a current source to balance out or subtract the base capacitance. The current source is used to provide a current based on the baseline capacitance and thereby subtract out the baseline capacitance from capacitance measurements. The microprocessor accesses and load the baseline values into a programmable current source before each measurement of each row and column intersection. This current compensation solution requires extra hardware which increases costs and is slower as additional operations and settling times increase the time for each scan.

Thus, conventional capacitive sensor systems are susceptible to capacitive variations and utilize ground referenced capacitive measurements resulting in less accurate position information.

SUMMARY OF THE INVENTION

Accordingly, embodiments of the present invention are directed to a system and method for determining position information e.g., with respect to a touch sensitive array. Position information is determined based on differential capacitance measurements in one embodiment. The differential capacitance measurements may be with respect to adjacent rows and/or columns of the array and are substantially immune to variations (e.g., temperature changes, dielectric changes, etc.) of a capacitive sensor array. The differential capacitive measurements further facilitate increased resolution and require fewer measurements thereby making scans faster and more precise.

More specifically, an embodiment of the present invention is directed to a method for determining position information. The method includes selecting a column, a first row, and a second row of a capacitive sensor array. The first row and second row intersect with the column of the capacitive sensor array. Further, the first and second row may be selected as an adjacent pair or a distant pair (e.g., separated by at least one other row). The method further includes measuring a differential capacitance between the first row and the second row and utilizing the differential capacitance in determining a location of an object proximate to the capacitive sensor array. The location of the object may be determined by computing capacitance values for each row and column intersection based on the differential capacitance measurements.

Another embodiment of the present invention is directed to a circuit or electronic system for determining position information. The system includes a sensor array controller for selecting each of a plurality of rows and each of a plurality of columns for measuring a differential capacitance. The differential capacitance may include the difference in capacitance between two adjacent rows and thus variations (e.g., temperature effects, dielectric variations, etc.) in the capacitive sensor array may be substantially removed. The capacitive sensor array is operable to be controlled by the sensor array controller for detecting a presence of an object proximate to the sensor array. The system further includes a data storage module for storing a plurality of differential capacitive measurements and a data processing module for processing the plurality of differential capacitive measurements to determine the position of an object proximate to a capacitive sensor array.

In one embodiment, the circuit for measuring the capacitance across two rows or columns is differential in nature thereby leading to a direct differential measurement which is supplied to a processor for position determination. By eliminating the base capacitance of the array in this fashion, more resolution applied via the capacitive sensor to the expected dynamic range for a touch. In another embodiment, however, absolute capacitance measurements can be taken and supplied to the processor which computes the different values via software.

In this fashion, embodiments of the present invention facilitate more precise capacitance measurements and therefore more accurate object location detection. Embodiments of the present invention further facilitate simplified capacitive sensor array systems by removing the necessity for current compensation circuitry. Moreover, embodiments of the present invention allow more frequent scans by reducing the number of measurements performed for each column.

DESCRIPTION OF THE INVENTION

Reference will now be made in detail to embodiments of the claimed subject matter, examples of which are illustrated in the accompanying drawings. While the invention will be described in conjunction with embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Example Systems

Figure 1:
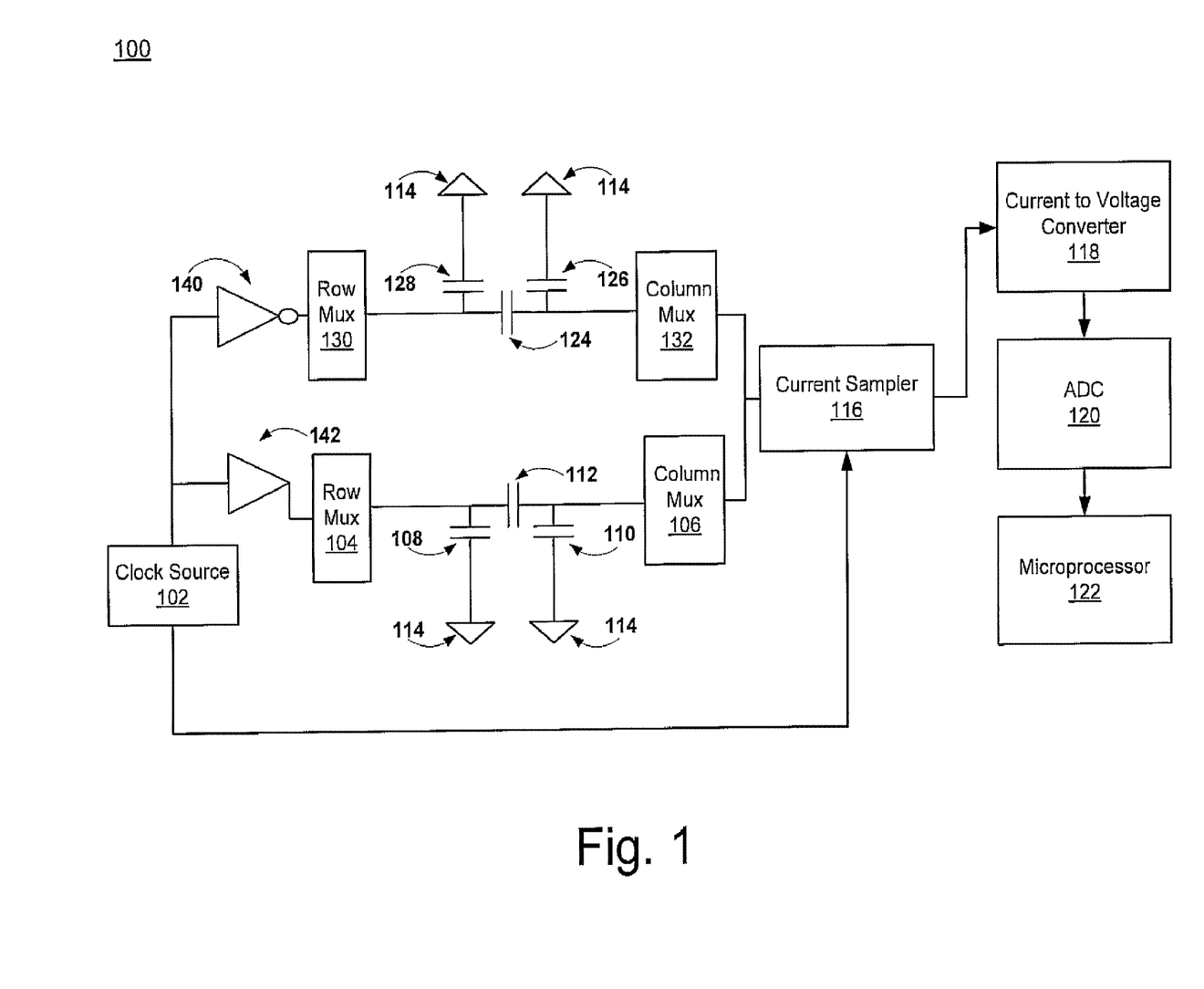
FIG. 1 shows block a diagram of an exemplary system for determining position information, in accordance with one embodiment of the present invention.
Figure 3:
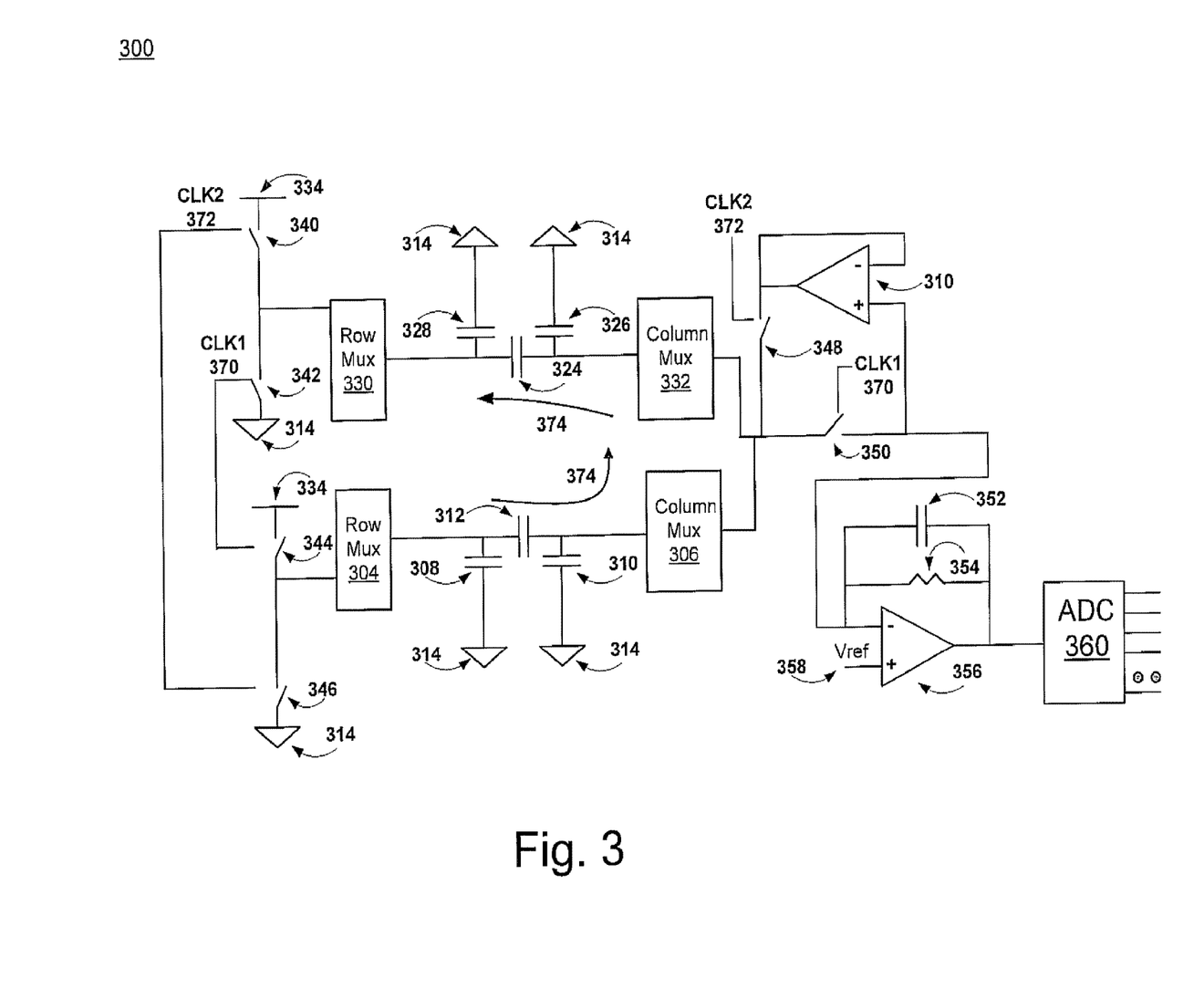
FIG. 3 shows block diagram of an exemplary implementation of a system for determining position information, in accordance with an embodiment of the present invention.
Figure 5:
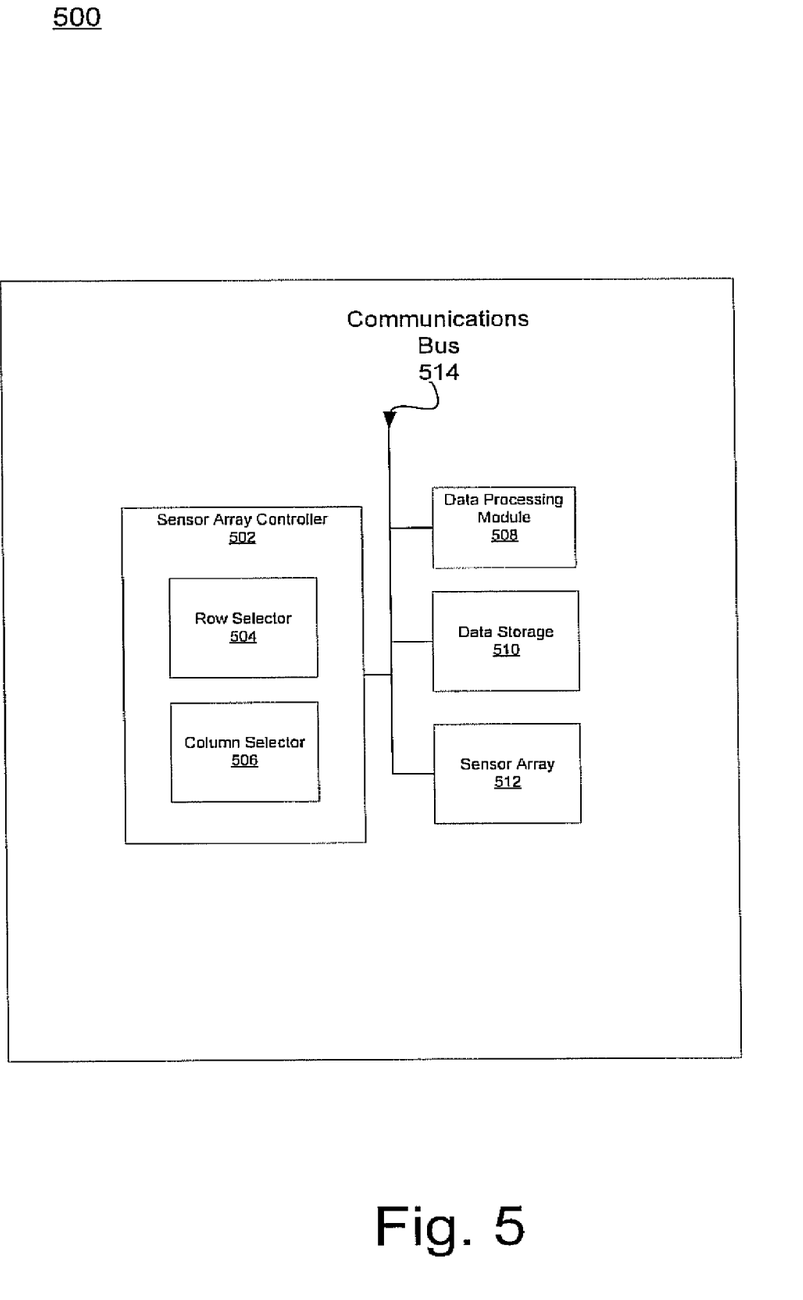
FIG. 5 shows an exemplary system for determining position information, in accordance with an embodiment of the present invention.

FIGS. 1, 3, and 5 illustrate example components used by various embodiments of the present invention. Although specific components are disclosed in circuits or systems 100, 300, and 500 it should be appreciated that such components are examples. That is, embodiments of the present invention are well suited to having various other components or variations of the components recited in systems 100, 300, and 500. It is appreciated that the components in systems 100, 300, and 500 may operate with other components than those presented, and that not all of the components of systems 100, 300, and 500 may be used to achieve the goals of systems 100, 300, and 500.

Further, systems 100, 300, and 500 include components or modules that, in various embodiments, are carried out by software, e.g., a processor under the control of computer-readable and computer-executable instructions. The computer-readable and computer-executable instructions reside, for example, in data storage features such as computer usable memory, removable storage, and/or non-removable storage. The computer-readable and computer-executable instructions are used to control or operate in conjunction with, for example, a processing unit It should be appreciated that the aforementioned components of systems 100, 300, and 500 can be implemented in hardware or software or in a combination of both.

FIG. 1 shows block diagram of an exemplary system for determining position information, in accordance with another embodiment of the present invention. System 100 includes clock source 102, buffer 142, inverter 140, row multiplexers 104 and 130, column multiplexers 106 and 132, row capacitors 108 and 128, column capacitors 110 and 126, measurement capacitors 112 and 124, current sampler 116, current to voltage converter 118, analog to digital converter (ADC) 120, and microprocessor 122. System 100 measures the differential current based on the difference in capacitance of measurement capacitors 112 and 124.

Clock source 102 is coupled to buffer 142, inverter 140, and current sampler 116. Buffer 142 is coupled to row multiplexer 104. Inverter 140 is coupled to row multiplexer 130. Row multiplexers 104 and 130 thus receive clock signals. The selection of rows and columns via row multiplexers 130 and 104 and column multiplexers 106 and 132 allows current sampler 116 to measure a differential current between two rows of a capacitive sensor array. It is appreciated that clock source 102, buffer 142, and inverter 140 may be interchanged with a component having an inverting and non-inverting state. It is further appreciated that the coupling of current sampler 116 and clock source 102 may be optional or current sampler 116 may be coupled to a microprocessor (e.g., microprocessor 122) or some external control.

In one embodiment, current sampler 116 provides synchronous rectification which is represented by a switch which becomes closed only on the positive transition of a clock signal from clock source 102. Current sampler 116 may be a switching circuit. Current to voltage converter 118 converts the measured current to a voltage for input to ADC 120. ADC 120 converts the analog voltage to a digital signal for input to microprocessor 122.

Microprocessor 122 controls row multiplexers 104 and 130 and column multiplexers 106 and 132, sets conversion times and collects the data from the capacitive sensor array. Microprocessor 122 may utilize column multiplexers 106 and 132 to select a single column of capacitive sensor array (e.g., an indium tin oxide (ITO) sensor array) and utilizes row multiplexers 104 and 130 to select a pair of rows. Of course the role of columns and rows can be switches in accordance with embodiments of the present invention and any discursion herein regarding a particular scan order is merely a convenience for illustration. The selection of two different rows in combination with the clock signal and inverted clock signal (e.g., via inverter 140) allows current to flow in opposite directions though measurement capacitors 112 and 124. The opposite current flow results in a current difference flowing into current sampler 116. That is, current sampler 116 receives the summation of the currents (e.g., in opposite directions) or a differential current. This differential current reflects the difference in the capacitance of measurement capacitors 112 and 124. For example, if the capacitance of capacitor 112 is greater than the capacitance of capacitor 124, there will be a net positive current remaining and measured by the current sampler 116.

The differential current measured is independent of physical variations on the capacitive sensor array that are common to both measured capacitors. For example, a temperature variation which uniformly impacts the capacitive sensor arrays may be substantially cancelled because both measurements capacitors 112 and 124 will include the noise signal which thereby will be subtracted out. Similarly, physical variations (e.g., dielectric changes caused by temperature changes, etc.) that impact the array in general are substantially removed from the differential current measurements.

The measuring of differential currents thereby reduces the corresponding dynamic range of the measurement chain. Due to the differential nature of the current measurements only the differences are measured which means the total dynamic range of the measurement circuit may be much smaller and more finely tuned to the range of expected capacitance variations of a touch. That is, embodiments of the present invention provide for zero current centered measurements. For example, where the difference in capacitance (as measured based on the current) is 0.1 pF to register a touch instead of an absolute measurement of 8.1 pF, the dynamic range can be tuned to measure small variations (e.g., a range of 0-0.5 pF instead of 0-10 pF). It is appreciated that the differential measurements of embodiments of the present invention thereby remove the necessity of a current source and additional circuitry for providing current compensation. Embodiments of the present invention may thus be simpler and more reliable with increase resolution.

Further, the more finely tune dynamic range facilitates much higher resolution. For example, if ADO 220 has 10 output bits for communicating a value to microprocessor, with embodiments of the present invention the 10 bits may be used to communicate values with a range of 1 pF instead of a range of 5 or 10 pF. Accordingly, embodiments of the present invention facilitate increased accuracy and resolution of measurements.

In one embodiment, the pairs of rows may be adjacent as microprocessor 122 goes through each column of a capacitive sensor array. That is, microprocessor 122 may select pairs of adjacent rows for making differential measurements. For example, microprocessor 222 may select column C0, then obtain differential measurements between rows R0 and R1, then R1 and R2, the R2 and R3, all the way up to R(N–1) and R(N).

However, row measurements may not necessarily be across adjacent rows. In another embodiment, the pairs of rows may be distant (e.g., separated by at least one other row) as microprocessor 122 goes through each column of a capacitive sensor array. That is, microprocessor 122 may select a first row and measure a differential capacitance between the first row and each of the other rows of the capacitive sensor array for each column. For example, microprocessor may selected column C0, then get differential measurements between row R0 and R1, then row R0 and R2, then rows R0 and R3, all the way up to row R0 and RN. Embodiments of the present invention may further include an extra row and column to be used a control (e.g., baseline) for differential measurements, e.g., a dummy row.

The scanning of the rows in pairs results in N–1 measurements per each column in a capacitive sensory array having N rows. That is, the scanning of the rows in pairs means that one less measurement is made per column which decreases the rime to scan the capacitive sensor array. For example, where a capacitive sensor array has 10 rows and 10 columns, 9 differential measurements for each of the 10 columns will be made. This results in a total of 90 (e.g., 9 differential measurements×10 columns) differential measurements being made. It is appreciated that a measurement for each row and column intersection would result in 100 measurements (e.g., 10 rows×10 columns). More generally, a capacitive sensor array with N row and M columns will have N–1 measurements per column and N–1×M measurements in total in accordance with embodiments of the present invention.

Microprocessor 122 further analyzes the data from the capacitive sensor array. Based on the differential current measurements and corresponding differential capacitance values, microprocessor 122 can determine the centroid of an object relative to the capacitive sensor array. In one embodiment, microprocessor 122 integrates the differential capacitive values going down each column to create a curve of the total capacitance at each row and column intersection (e.g., See FIG. 4). The integration may be then used for position determination. The curve may be further adjusted by adding the absolute value of the lowest negative number to each capacitance value thereby shifting the curve up to assist in locating a centroid. In another embodiment, microprocessor 122 may execute a method of searching the differential values for locations where the differential values change from positive to negative (e.g., cross zero).

Figure 2:
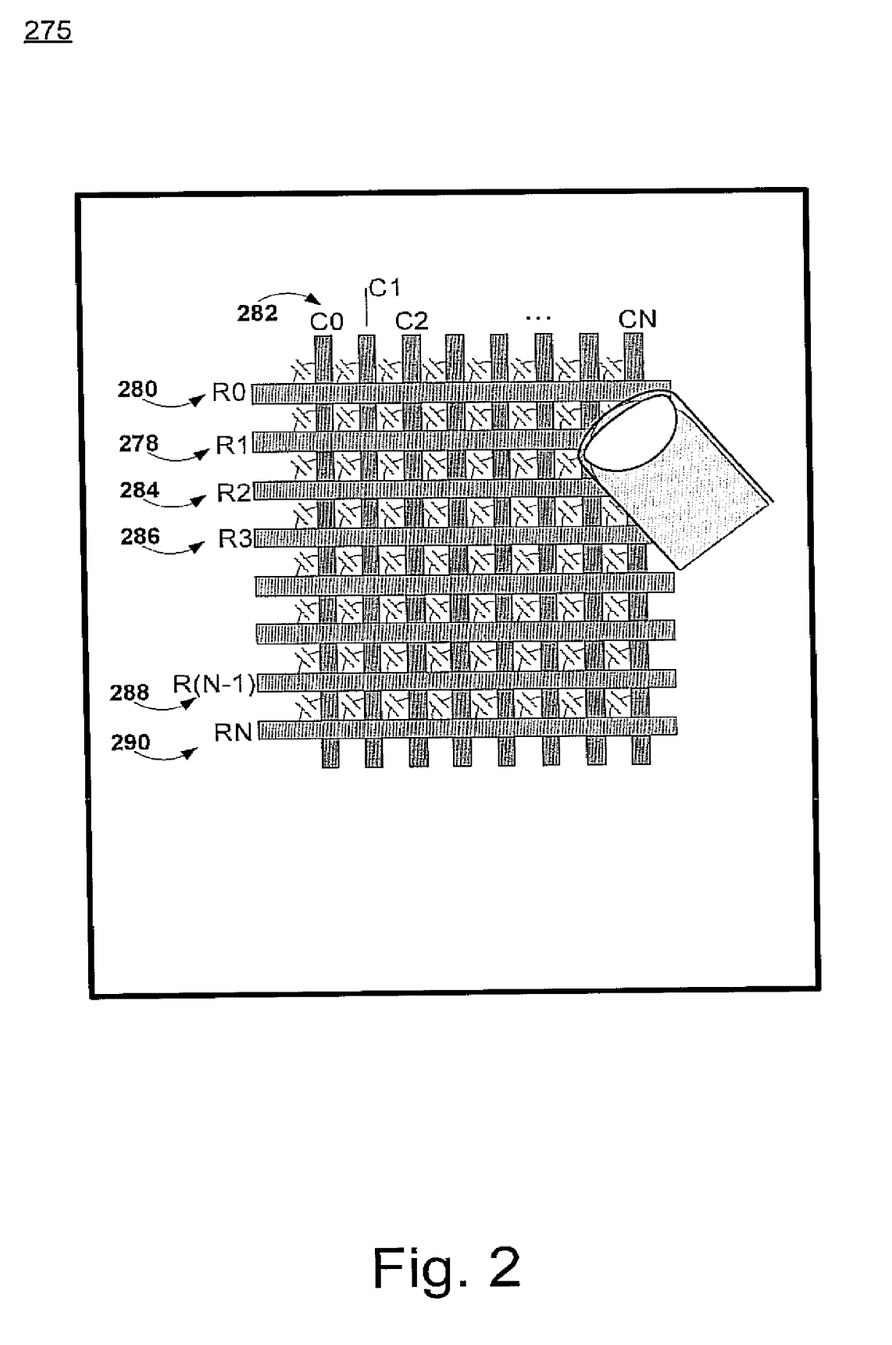
FIG. 2 shows a block diagram of an exemplary capacitive sensor array, in accordance with another embodiment of the present invention.

FIG. 2 shows block diagram of an exemplary capacitive sensor array, in accordance with another embodiment of the present invention. Capacitive sensor array 275 includes rows R0-RN and columns C0-CN. Multiplexers 104, 106, 130, and 132 may be used to select respective pairs of rows and columns as microprocessor 122 scans each pair of rows and the corresponding column intersection.

As described herein, scanning of capacitive sensor array 275 may be based on differential measurements of adjacent pairs (e.g., separated by at least one other row). For example, column C0 282 may be selected and differential measurements may be made with row R0 280 and row R1 278, then row R1 278 and row R2 284, then row R2 284 and row R3 286, all the way up to row R(N–1) 288 and row RN 290. As discussed herein, the roll of the columns and rows can be reverses in accordance with embodiments of the present invention.

As described herein, scanning of capacitive sensor array 275 may also be based on differential measurements of distant pairs (e.g., separated by at least one other row). For example, column C0 282 may be selected and differential measurements may be made with row R0 280 and row R1 278, then row R0 280 and row R2 284, then row R0 280 and row R3 286, all the way up to row R0 280 and row RN 290.

FIG. 3 shows block diagram of an exemplary implementation of a system for determining position information, in accordance with an embodiment of the present invention. System 300 includes clock1 370, clock2 372, voltage rail 334 (e.g., Vcc), row multiplexers 304 and 330, column multiplexers 306 and 332, row capacitors 308 and 328, column capacitors 310 and 326, measurement capacitors 312 and 324, switches 340-350, amplifiers 310 and 356, resistor 354, capacitor 352, reference voltage (Vref) 358, and analog to digital converter (ADC) 360. Circuit 300 measures the differential current based on the difference in capacitance of measurement capacitors 312 and 324. Arrows 374 reflect an exemplary current flow.

System 300 operates in a substantially similar manner to system 200. Switches 342, 344, and 348 are coupled to clock1 370. Switches 340, 346, and 348 are coupled to clock2 372. It is appreciated that clock1 370 and clock2 372 may be inverses of each other. Row multiplexers 330 and 304 and column multiplexers 306 and 332 may be controlled by a microprocessor (e.g., microprocessor 222).

Amplifier 310 in combination with switches 348 and 350 acts a current sampler (e.g., current sampler 216) to sample differential current from measurement capacitors 312 and 324. The differential current measurement signal then passes to capacitor 352, resistor 354, and amplifier 358. Amplifier 358 has reference voltage (Vref) 358 as an input. The combination of capacitor 352, resistor 354, and amplifier 358 acts to convert the current to a voltage for input to ADC 360. ADC 360 may then convert the voltage to a digital signal for input to a microprocessor (e.g., microprocessor 222).

Figure 4:
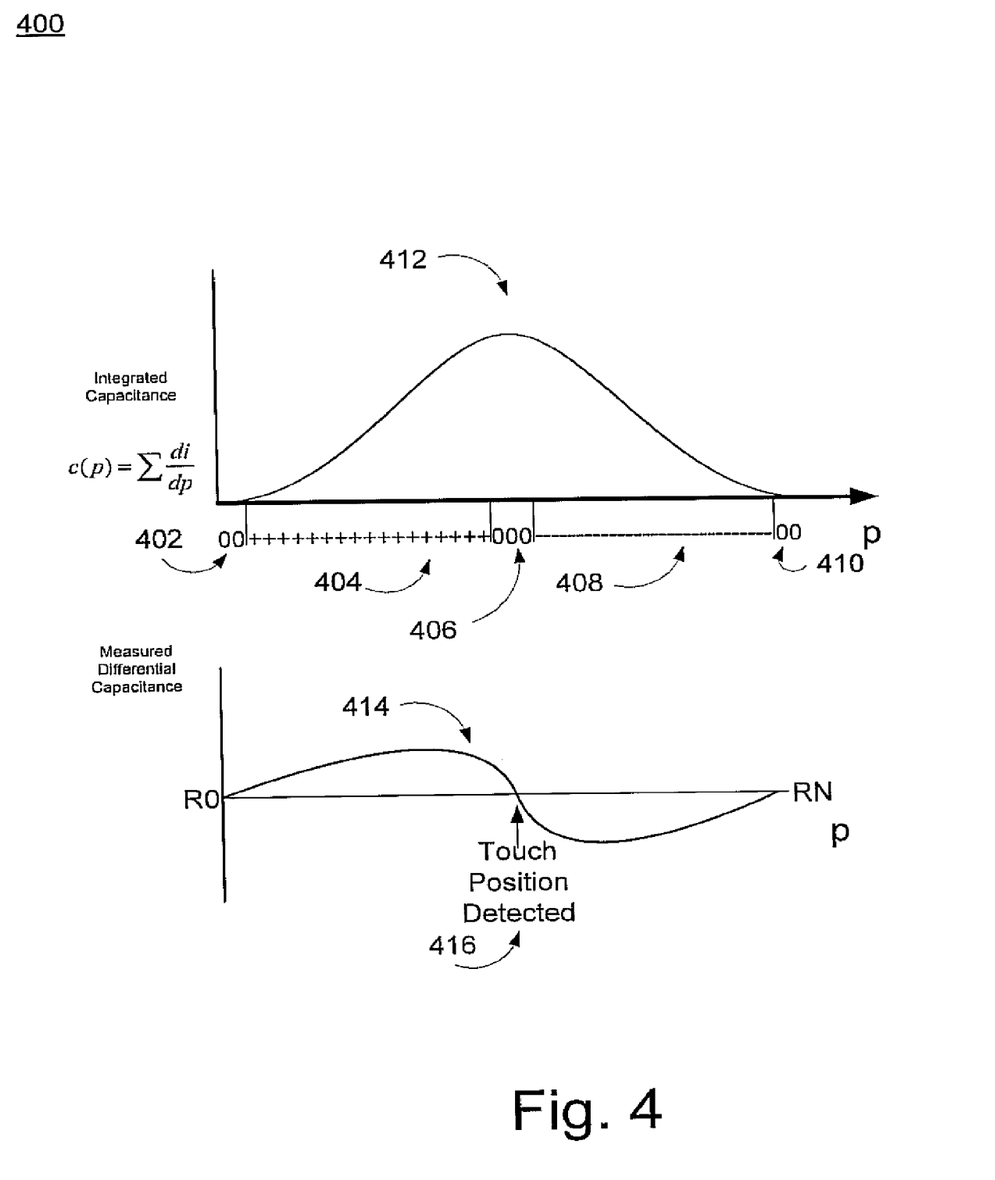
FIG. 4 shows an exemplary graph of capacitance measurements, in accordance with an embodiment of the present invention.

FIG. 4 shows an exemplary graph of capacitance measurements, in accordance with an embodiment of the present invention. Each graph includes a vertical axis corresponding to the capacitance and horizontal axis corresponding to position (p) (e.g., row). Curve 414 corresponds to the measured differential capacitance for each position (e.g., row). A touch position is detected at position 416 where curve 414 crosses the axis. Line 412 represents exemplary capacitance values measured over a plurality of row and column intersections (e.g., for a give column). Line 412 may be expressed by the equation:

$$f(p) = \sum \frac{di}{dp}$$

Where $$\frac{di}{dp}$$

is the differential capacitance measured at each row and column intersection for the given column and reported to the processor. The function $f(p)$ is the summation of each $$\frac{di}{dp}$$

which results in the capacitance values as depicted by line 412. The function $f(p)$ may correspond to the capacitance values for a single column. The summation or integration may be performed by a processor (e.g., processor 122). Further, the processor detects a touch position by analyzing the curve of the function $f(p)$.

Regions 402 and 410 corresponds to areas where the differential capacitive measurements have minimal to zero difference and may correspond to row and column intersections where an object (e.g., finger) is not present.

Region 406 corresponds to an area where the capacitance on each measurement capacitor (e.g., measurement capacitors 212 and 224) is substantially similar where there is no object nearby and thus the differential capacitance is minimal or zero. Region 406 may correspond to the centroid where an object is present over or on top of a capacitive sensor array (e.g., capacitive sensor array 275). Region 404 corresponds to locations where the differential capacitance is increasing (e.g., the row and column intersections on the edge of an object).

Region 408 corresponds to locations where the differential capacitance is decreasing (e.g., the row and column intersections on the edge of an object). It is appreciated that the increasing or decreasing nature of the differential capacitive values may be based on the selection of current flow (e.g., as depicted in FIG. 3).

FIG. 5 shows an exemplary system for determining position information, in accordance with an embodiment of the present invention. System 500 includes sensor array controller 502, data processing module 508, data storage 510, sensor array 512, and communications bus 514. The blocks of system 500 may be carried out or performed by system for determining position information (e.g., system 100 or 300). Capacitive sensor array 512 is operable to be controlled by the sensor array controller for detecting the presence of an object proximate to the sensor array.

Sensor array controller 502 selects each of a plurality of rows and each of a plurality of columns for measuring a differential capacitance. Sensor array controller 502 includes row selector 504 and column selector 506. Sensor array controller 502 may use the column selector 506 to select each column of capacitive sensor array and use row selector 504 to select pairs of row for measuring differential capacitances. It is appreciated that embodiments of the present invention may also select a row and pairs of columns.

As described herein, the differential capacitance may be measured by a pair of adjacent rows or a pair of distant rows (e.g., rows separated by at least one other row). For example, differential capacitances may be measured for row 0 and row 1, row 1 and row 2, and so on in adjacent pairs until row N−1 and row N for a capacitive sensor array having N rows. As another example, differential capacitances may be measured for row 0 and row 1, row 0 and row 2, and so on with row 0 being paired with successive rows until row 0 is paired with row N for a capacitive sensory array having N rows. As described herein, the measuring of differential capacitances for pairs of rows allows sensor array controller to make N−1 measurements per column for a capacitive sensor array having N rows.

Further, as described herein, the differential measurements performed by embodiments resulting the capacitance measurements being substantially immune to common mode variations in the capacitive sensor array. The differential measurements facilitate increased resolution as the range of measurement can be calibrated accordingly to the capacitance change instead of the absolute capacitance value (e.g., capacitance with respect to ground).

Data storage module 510 stores a plurality of differential capacitive measurements. As described herein, a plurality of differential capacitive measurements may be made for each pair of rows in a capacitive sensor array.

Data processing module 508 processes a plurality of differential capacitive measurements to determine the position of an object proximate to a capacitive sensor array. As described herein, data processing module 508 may be operable to compute capacitance values for each row and column intersection of the capacitive sensor array based on the differential capacitance measurements.

Example Operations

Figure 6:
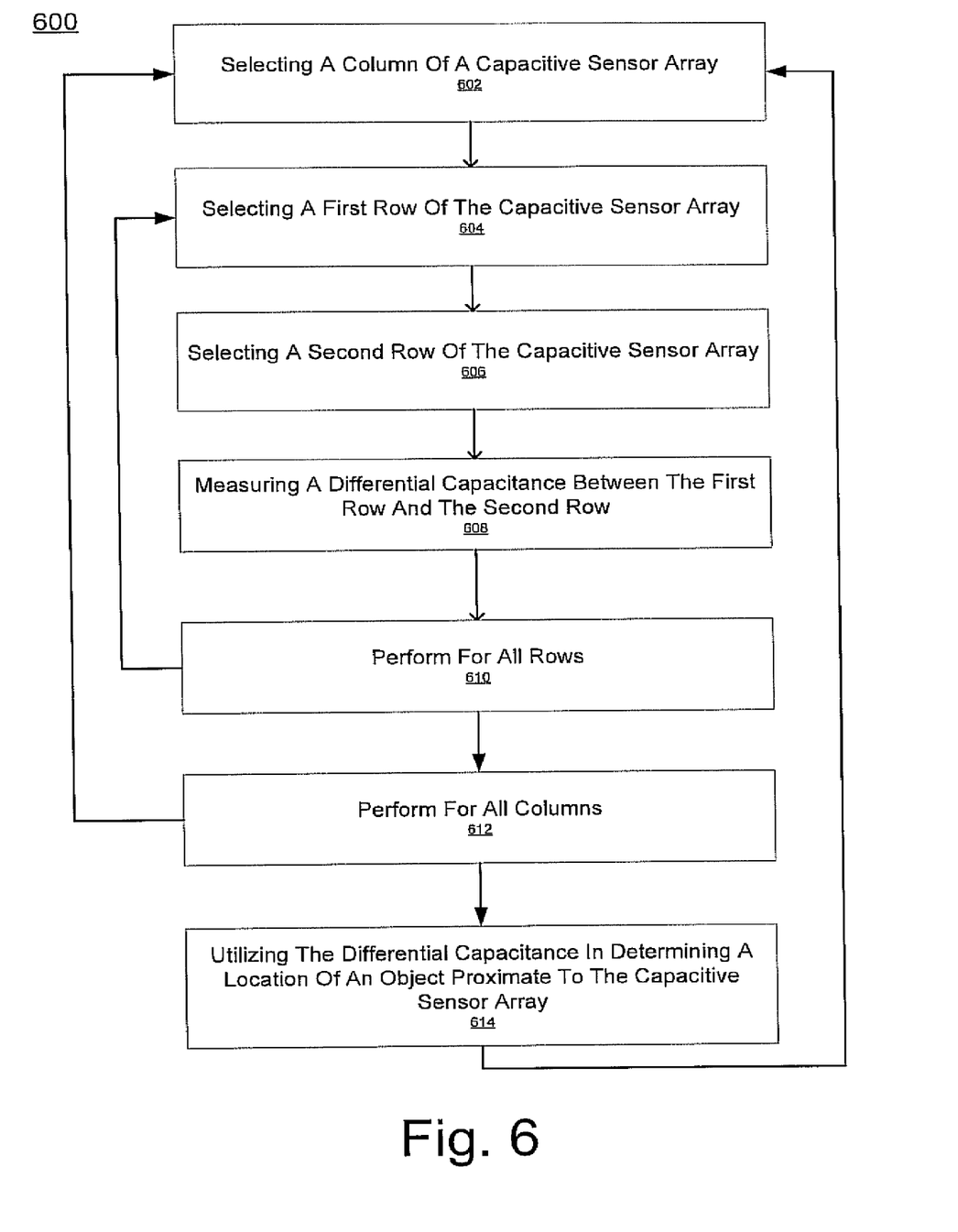
FIG. 6 shows a flowchart of an exemplary method for determining position information, in accordance with an embodiment of the present invention.

With reference to FIG. 6, exemplary flowchart 600 illustrates example blocks used by various embodiments of the present invention. Although specific blocks are disclosed in flowchart 600, such blocks are examples. That is, embodiments are well suited to performing various other blocks or variations of the blocks recited in flowchart 600. It is appreciated that the blocks in flowchart 600 may be performed in an order different than presented, and that not all of the blocks in flowchart 600 may be performed. Flowchart 600 includes processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

In particular, FIG. 6 shows a flowchart of an exemplary process for determining position information, in accordance with an embodiment of the present invention. Blocks of flow chart 600 may be carried out by modules of system (e.g., system 500) for determining position information.

At block 602, a column of a capacitive sensor array is selected. At block 604, a first row of the capacitive sensor array is selected. At block 606, a second row of the capacitive sensor array is selected. The first row and the second row intersect with the selected column of the capacitive sensor array. In one embodiment, the first row and the second row are adjacent. In another embodiment, the first and second row may be distant from one another (e.g., separated by at least one other row).

At block 608, a differential capacitance between the first row and the second row is measured. As described herein, the differential capacitance is independent of variations in the capacitive sensor array. Further, the differential capacitance facilitates increased resolution as the measurements are zero centered. The measuring of the differential capacitances facilitates quicker scans because the differential measurements are performed N−1 times per column for a capacitive sensor array comprising N rows.

At block 610, a check is performed to determine if the differential measurements have been performed for all rows. If there are rows remaining in a column to be measured block 604 is performed. If there are no more rows remaining, block 612 may be performed.

At block 612, a check is performed to determine if the differential measurements have been performed for all columns. If there are columns remaining to be measured block 604 is performed. If there no more columns remaining to be measured, block 614 may be performed.

At block 614, the differential capacitance is utilized in determining a location of an object proximate to the capacitive sensor array. As described herein, the differential capacitances are operable to be used to compute capacitance values for each row and column intersection of the capacitive sensor array (e.g., FIG. 4).

Thus, embodiments of the present invention facilitate more accurate capacitance measurements which are immune to capacitive sensor variations (e.g., temperature changes, dielectric property changes, etc.). Embodiments of the present invention further provide increased resolution and zero centered measurements thereby making current compensation circuitry unnecessary for tuning the dynamic range of the measurements. The measuring of differential capacitances by embodiments of the present invention allows for faster scanning of a capacitive sensor array by performing one less measurement per column.

Embodiments of the present invention are thus described. While the present invention has been described in particular embodiments, it should be appreciated that the present invention should not be construed as limited by such embodiments, but rather construed according to the below claims.

What is claimed is:

1. A method for detecting a feature of a conductive object on a capacitive sensor array, the method comprising:
    selecting a first electrode of the capacitive sensor array;
    selecting a second electrode of the capacitive sensor array;
    selecting a third electrode of said capacitive sensor array, wherein said second electrode and said third electrode intersect with said first electrode of said capacitive sensor array;
    receiving:
    a first current associated with a capacitance of said second electrode and said first electrode, the first current induced on the second electrode by a drive signal applied to the first electrode and capacitively coupled to the second electrode; and
    a second current associated with another capacitance of said third electrode and said first electrode, the second current induced on the third electrode by the drive signal applied to the first electrode and capacitively coupled to the third electrode;
    measuring a capacitance between said second electrode and said third electrode, based on a comparison of the first and second currents, the measuring of the capacitance including:
    converting the result of the comparison of the first and second currents to a digital value, the digital value representative of the measured capacitance; and
    detecting a touch feature proximate to said capacitive sensor array, based on the measured capacitance.

2. The method of claim 1, wherein said second electrode and said third electrode are adjacent to one another.

3. The method of claim 1, wherein the first and second electrodes are disposed along each of two orthogonal axes respectively.

4. The method of claim 1, wherein the second and third electrodes are parallel to each other.

5. The method of claim 1, wherein said second electrode is separated from said third electrode by at least one other electrode.

6. The method of claim 1, wherein the detecting the touch feature, based on the measured capacitance includes detecting an absence of the touch feature proximate to said capacitive sensor array, based on the measured capacitance.

7. The method of claim 1, further comprising:
    measuring a plurality of capacitances over a plurality of electrodes of said first electrode;
    integrating said plurality of capacitances to obtain integrated capacitance values; and
    using said integrated capacitance values to detect the touch feature.

8. The method of claim 1, wherein said measured capacitance excludes a contribution from uniform variations in said capacitive sensor array.

9. The method of claim 1, wherein said comparison of the first and second currents is performed by a differential current measurement circuit.

10. The method of claim 1, wherein said capacitive sensor array comprises N electrodes disposed along a first axis and said measuring of said capacitance is performed N−1 times per electrode along a second axis.

11. An apparatus to determine location of an object proximate to a capacitive sensor array, the apparatus comprising:

a first input coupled to a first electrode of the capacitive sensor array;

a second input coupled to a second electrode of the capacitive sensor array;

a third input coupled to a third electrode of the capacitive sensor array, wherein the second electrode and the third electrode intersect with the first electrode of the capacitive sensor array;

a receive circuit coupled to the first, second and third inputs, the receive circuit configured to receive:

a first current associated with a capacitance of the first and second electrodes, the first current induced on the second electrode by a drive signal applied to the first electrode and capacitively coupled to the second electrode; and a second current associated with another capacitance of the first and third electrodes, the second current induced on the third electrode by the drive signal applied to the first electrode and capacitively coupled to the third electrode;

a compare circuit configured to compare capacitance between the second and third electrodes represented by the first and second currents, wherein the capacitance is converted to a digital value representative of a result of a comparison of the first and second currents; and a processor configured to detect a feature of a conductive object proximate to the capacitive sensor array, based on a differential capacitance represented by a difference between the first and second currents.

12. The apparatus of claim 11, wherein the second and third electrodes are adjacent.

13. The apparatus of claim 11, wherein the first electrode is disposed along an axis orthogonal to an axis on which the second and third electrodes are disposed.

14. The apparatus of claim 11, wherein the second electrode is separated from the third electrode by at least one other electrode.

15. The apparatus of claim 11, wherein the detecting the feature of the conductive object, based on the differential capacitance, further comprises detecting an absence of the feature of the conductive object.

16. The apparatus of claim 11, wherein the compare circuit is configured to measure a plurality of capacitances of a plurality of electrodes disposed along a second axis and the first electrode disposed along a first axis, and the processor is configured to integrate the plurality of capacitances to obtain integrated capacitance values, and use the integrated capacitance values to determine the location.

17. The apparatus of claim 11, wherein the differential capacitance excludes a contribution from uniform variations in the capacitive sensor array.

18. The apparatus of claim 11, wherein the compare circuit includes a differential current measurement circuit.

19. The apparatus of claim 11, wherein said capacitive sensor array comprises N electrodes disposed along a first axis and a comparing of said capacitance by the compare circuit is performed N−1 times per electrode along a second axis.

20. A system for determining position information comprising:

a sensor array controller for selecting each of a first plurality of electrodes disposed along a first axis and each of a second plurality of electrodes disposed along a second axis for measuring a capacitance, wherein each of the second plurality of electrodes receives an induced current from a signal applied to at least one of the first plurality of electrodes and capacitively coupled to each of the second plurality of electrodes, wherein the induced current on each of the second plurality of electrodes is converted to a digital value by an integration circuit, the digital value representative of the signal and the capacitive coupling between the at least one of the first plurality of electrodes and each of the second plurality of electrodes, wherein said capacitance comprises the difference in capacitance between two of said second plurality of electrodes and at least one of said of second plurality of electrodes;

a capacitive sensor array operable to be controlled by said sensor array controller and operable to respond to a presence of an object proximate to said capacitive sensor array;

a data storage module for storing a plurality of capacitive measurements from said sensor array controller; and a data processing module for processing said plurality of capacitive measurements to detect the presence of a feature of the object proximate to said capacitive sensor array.

* * * * *